July 11, 1950     B. G. DAGGETT     2,514,567
APPARATUS FOR CUTTING TEETH IN HAND SAWS
Filed May 14, 1947     2 Sheets-Sheet 1
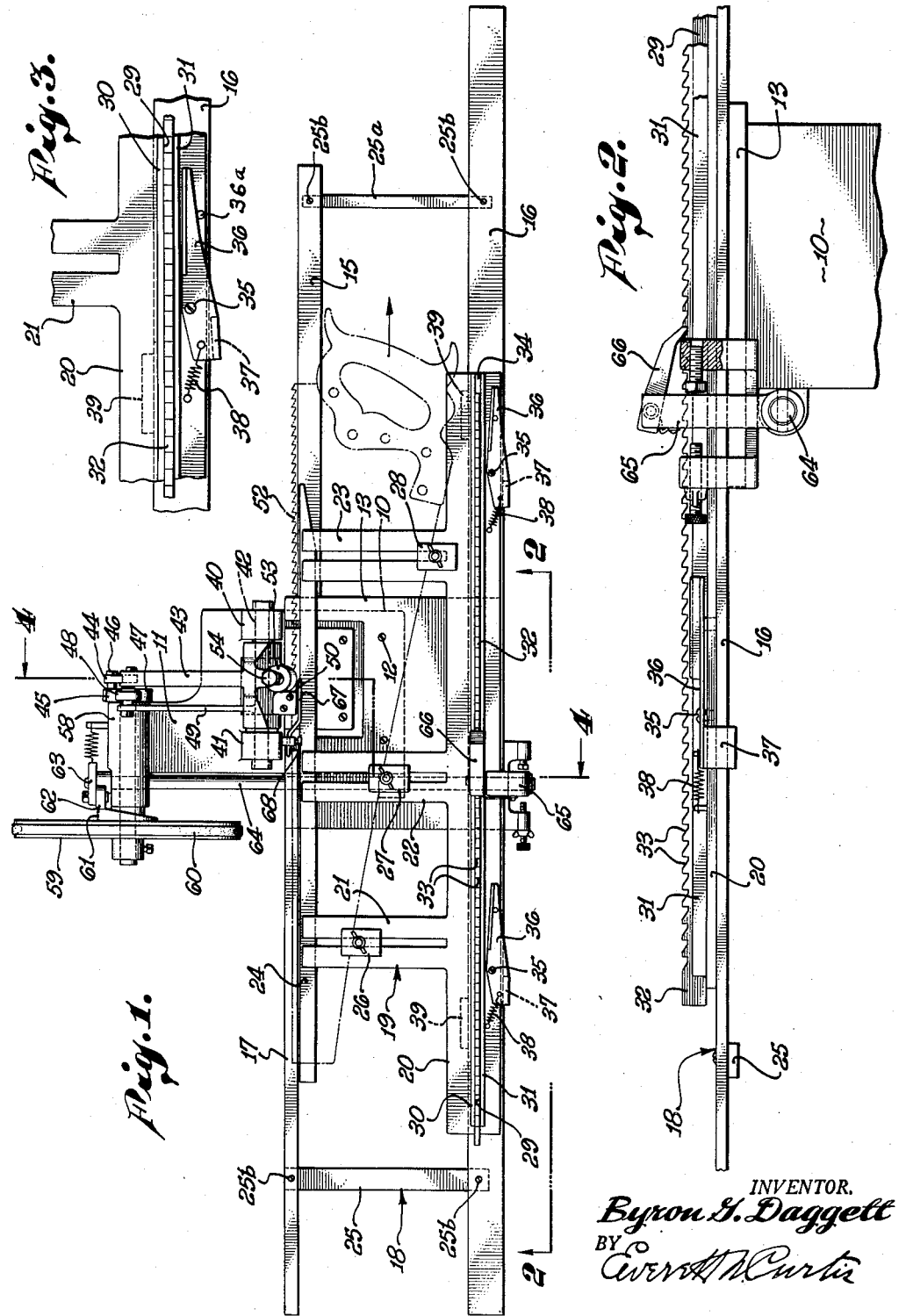
INVENTOR.
Byron G. Daggett
BY
ATTORNEY July 11, 1950
B. G. DAGGETT
2,514,567
APPARATUS FOR CUTTING TEETH IN HAND SAWS
Filed May 14, 1947
2 Sheets-Sheet 2
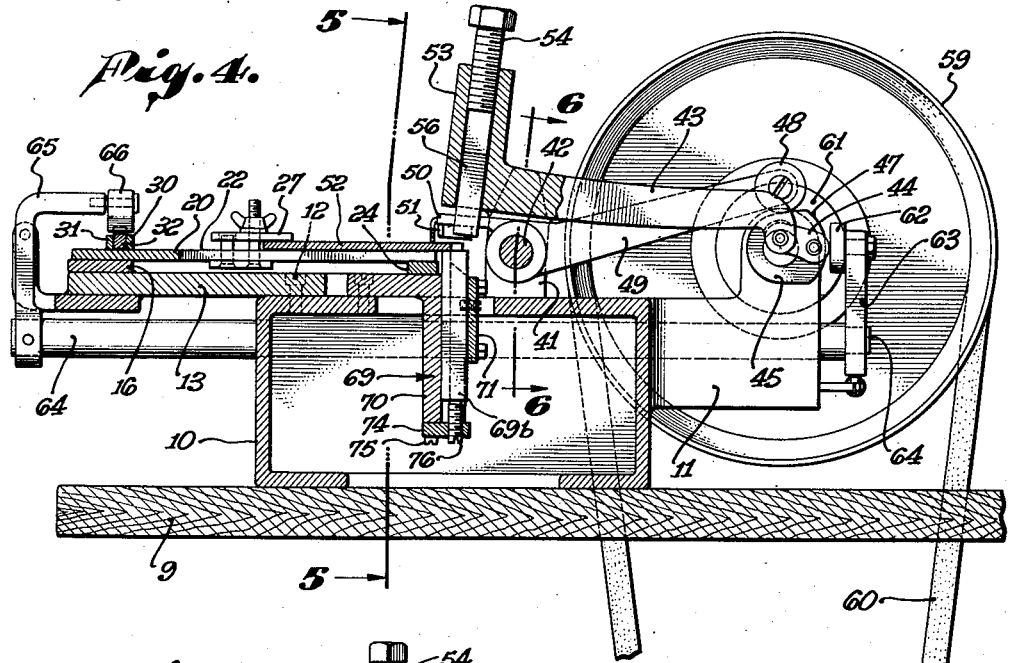
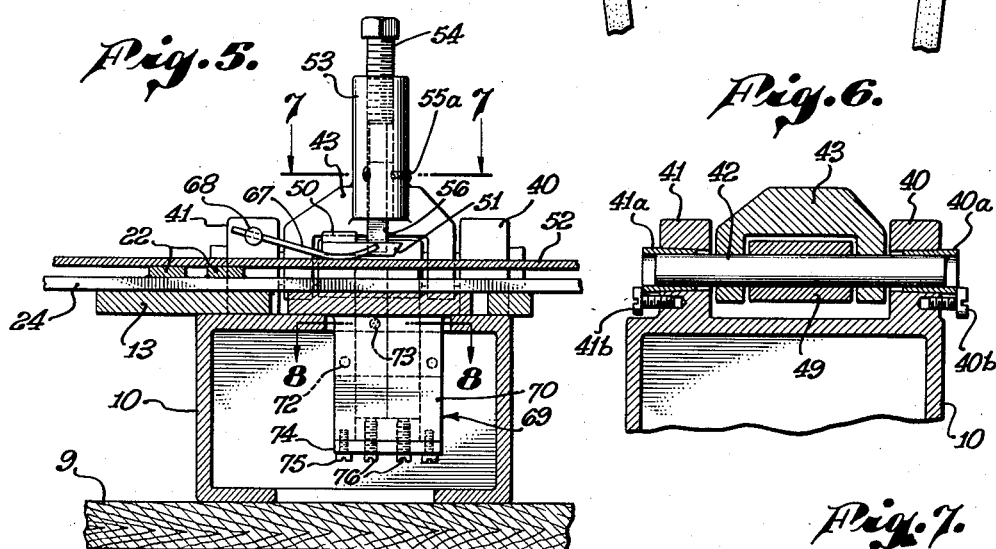
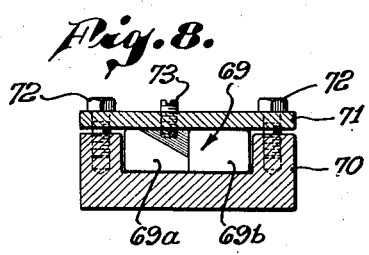
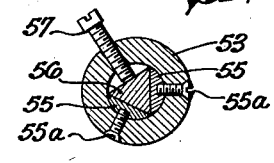
INVENTOR.
Byron G. Daggett
BY Everett N. Curtis
ATTORNEY Patented July 11, 1950

2,514,567

UNITED STATES PATENT OFFICE 2,514,567

APPARATUS FOR CUTTING TEETH IN HAND SAWS

Byron G. Daggett, San Diego, Calif.

Application May 14, 1947, Serial No. 747,907

5 Claims. (Cl. 76—29)

My invention relates to apparatus for cutting teeth in hand saws, and its objects are to cut a new set of teeth in hand saws both new and those which have already been used and in which the teeth have become damaged or defective; to change in such cutting if desired the spacing of the teeth so as to meet the requirements of the mechanic or other user of the saw; to accomplish the cutting of the teeth in a minimum amount of time consistent with accomplishing the best results; to render the parts readily accessible for inspection, adjustment, replacement, restoration or repair and generally to provide an apparatus which is economical of construction, efficient in action and of prolonged life and durability. My invention further consists of other novel features of construction, and combinations and arrangements of parts, illustrated in the drawing and hereinafter more specifically described and claimed.

Attention is hereby directed to the drawing illustrating a preferred form of my invention, in which similar numerals of designation refer to similar parts throughout the several views, and in which, Figure 1 is a plan view of a preferred form of apparatus embodying my invention showing the track and carriage mounted thereon, upon which carriage the saw is shown to be attached in operative position; the punch mechanism for cutting the teeth of the saw and adjacent mechanism also being shown;

Fig. 2 is a front elevation of a portion of the apparatus shown in Fig. 1, looking at the same in the direction of the arrows 2—2;

Fig. 3 is an enlarged detail plan view showing the frictional clamping means for slidably holding the carriage in its progress on the track, in unclamped position;

Fig. 4 is a lateral section on line 4—4 of Fig. 1, looking in the direction of the arrows;

Fig. 5 is a section on line 5—5 of Fig 4, looking in the direction of the arrows;

Fig. 6 is a section on line 6—6 of Fig. 4, looking in the direction of the arrows;

Fig. 7 is a section of Fig. 5 on line 7—7, looking in the direction of the arrows, and Fig. 8 is a section on line 8—8 of Fig. 5 looking in the direction of the arrows.

Referring to the drawing, secured to the bed or foundation 9 is the hollow casting 10, the body of which is rectangular in form and to which is secured the extension 11 preferably integral therewith. Mounted upon the casting 10 and secured thereto by means of cap screws 12 is the plate 13. Firmly attached to the plate 13 by any suitable means are the rails 15, 16 and 17 of the track 18. Slidably mounted upon the track 18 is the carriage 19, comprising the flat longitudinal member 20, having integral therewith the laterally extending arms 21, 22 and 23, the ends of which are respectively welded or otherwise secured to the strip 24. For the purpose of securing the saw to the carriage, I provide the clamps 26, 27 and 28 which are adjustably mounted upon the arms 21, 22 and 23, respectively. For the purpose of maintaining the tracks 16 and 17 in proper alignment, I provide the ties 25 and 25a the ends of which are secured thereto by means of cap screws 25b.

Resting within the recess 29 formed between the ties 30 and 31, welded to the member 20, is the index bar 32, which index bar is provided with equally spaced teeth 33. This index bar is for the purpose of bringing about the required spacing of new teeth of the saw formed in the manner hereinafter described and may be interchanged with other bars with different spacing of the teeth if desired. Longitudinal movement of the bar 32 is prevented by the stop 34 at the end of the recess 29.

Pivotally mounted upon longitudinal member 20 by means of machine screws 35 are the clamps 36 releasably in engagement with bosses 36a on said member, and downwardly depending from each of said clamps and preferably integral therewith is a shoe 37 in sliding contact with one side of rail 16; a compression spring 38 attached to one end of each clamp and also to the member 20, serving normally to keep each shoe 37 in yielding sliding engagement with track 16 as shown in Fig. 1. Preferably secured to the underside of member 20, opposite to each of the clamps 36, and in sliding contact with the opposite side of the track 16, are the shoes 39 forming a rigid part of the structure of said member 20 (see Fig. 3).

Mounted upon the casting 10 are the bearings 40 and 41, and journalled within said bearings is the shaft 42, to which is firmly attached one end of the rocker arm 43; the other end of said arm being secured by the connecting rod 44 to the crankshaft 45 by means of crankpin 46. The periphery of said crankshaft 45 is contoured to form the cam 47 positioned to engage with the cam roll 48 upon one end of the stripper arm 49, the other end of which is mounted to oscillate upon the shaft 42. Also as shown, the said stripper arm 49 is provided with the extension 50 having the finger 51 located to make rigid contact with the face of saw 52 and extending forwardly and upwardly from the rocker arm 43, is the socket 53, the upper part of the base of said socket being threaded to receive the adjusting screw 54 and the lower part of said bore having secured therein gibbs 55; machine screws 55a serving to hold the said gibbs firmly in position. In contact with said gibbs, is the punch 56, a set screw 57, threaded to engage an opening in the wall of socket 53, serving to contact the wall of said punch and to hold the punch rigidly in place, and to guard the same against dislodgment.

As shown in Fig. 1 of the drawing, the main portion of crankshaft 45 is journalled in bearing 58 on extension 11, and connected with the outer end of said crankshaft 45 is the drive pulley 59, connected by the belt 60 to a suitable source of power. Attached to the pulley 59 is the cam 61, upon which rides the cam roller 62 attached to the link 63, secured to the shaft 64, upon whose outer end is mounted the arm 65, carrying the pawl 66 in contact with the teeth 33 of the index bar 32.

As illustrated in Fig. 6, I have shown a special form of bushing 41a and 40a for bearings 41 and 40, respectively, each of said bushings being tapered in form and slotted on one side in order to permit longitudinal adjustment thereof by the adjusting screws 41b and 40b, respectively, engaging with the walls of bushings 41a and 40a, so that when the said bushings become worn they may be adjusted to take up the wear of the shaft 42 thereof. Also in Fig. 5, I have shown spring 67 affixed by the pin 68 to the bearing 41, the free end of said spring being located so as to make engaging contact with the saw 52 and to hold securely the same in operative position.

Also in Fig. 8, I have shown the die 69 and the holding means therefor comprising the channeled and flanged casting 70 and clamp 71 secured thereto by the cap screws 72 and set screw 73. As further shown in Figs. 4 and 5 the said holding means for the die 69 also comprises the cap plate 74 secured to said flange 70 by the cap screws 75. Also the die 69 is shown preferably made of two separated parts, or pieces, 69a and 69b, adjusting screws 76, threaded to engage with openings provided therefor in said plate 74, and in contact with the lower ends of said parts, serving to adjust the same upwardly or downwardly as may be required.

To operate my improved apparatus, the hand saw 52 is secured to the carriage 18, by means of clamps 26, 27 and 28; and the toothed edge thereof, or edge in which the teeth are to be cut, placed in operative position on bar 17 so that said edge will be centered in respect to the middle of the top of said bar 17, and positioned to slide thereon. At the same time, there is installed in the groove 29, the index bar 32 having the number of teeth in the spacing required. Thereupon the arms of the clamps 36 are manually released from bosses 36a upon the carriage member 20, and the shoes 37 brought into yielding sliding contact with the rail 16. Then power being applied through the connection of the belt 60 with pulley 59, the aforesaid punch mechanism is started in operation, and the teeth punched in the edge of the saw blade in the same manner as that used by the ordinary punch, as well understood in the art, greatly aided and assisted, however, by my new rocker system of operation of said punch and the novel positive mechanical stripper, each hereinbefore more particularly described; the rocker system comprising arm 43 and laterally connected mechanism for operating the same and the said stripper comprising the arm 49 and finger 51 serving intermittently to hold the edge of the saw rigidly to the die solely while the punch is cutting a tooth, and while the punch is being withdrawn from the cut thereof.

In feeding the saw through the apparatus so that the teeth are regularly cut by the punch, one tooth at a time, the action of the apparatus is as follows: As the pulley 59 revolves the movement of cam 61 causes the cam roll 62 to move back and forth through a narrow arc, the link 63, and thereby to oscillate the shaft 64, whose outer end is connected with arm 65, upon which is pivotally mounted the pawl 66 in contact with the teeth 33 of the index bar 32, with the result that with every revolution of the pulley 59 the said bar is advanced one tooth carrying the carriage therewith, and upon the carriage coming to rest, the punch is timed to punch one tooth out of the edge of the saw.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the above description, and all changes which come within the meaning and range of equivalency of the claims are therefore intended to be embraced therein.

What I claim and desire to secure by Letters Patent is:

1. In apparatus of the character described, a base, a carriage for a hand saw mounted to slide upon said base, index means affixed to said carriage and operable to advance said saw through the space required to form a single tooth, a rocking arm carrying a punch and a die adjustably mounted upon said base and located to contact the edge of the blade of said saw, said punch being secured in a socket upon said arm by pressure of set screws and gibbs adjustably fastened to the inner wall thereof, and mechanism cooperating with said index means and said punch and die for cutting successive teeth in the edge of said saw.

2. In apparatus for cutting teeth in handsaws, the combination of a base; rails forming a track horizontally secured to the top of said base; a carriage for said hand saw mounted to slide upon said track; an equally spaced toothed index bar removably affixed to said carriage; a pawl mounted upon said base and operatively engaging with the teeth of said bar; means connected with said base for actuating said pawl and for moving said carriage the space of one tooth of said bar; an arm pivotally mounted upon a shaft journalled in longitudinally adjustable tapered bushings within bearings secured to said base; a punch adjustably secured in upright position to one end of said arm; and a die mounted upon said base and positioned to engage with said punch; said arm cooperating with said index means for cutting one tooth at a time in regular continuous spaced succession from the edge of said saw.

3. In apparatus for cutting teeth in handsaws, the combination of a base; rails forming a track horizontally secured to the top of said base; a carriage for said hand saw mounted to slide upon said track; an equally spaced toothed index bar removably affixed to said carriage; a pawl mounted upon said base and operatively engaging with the teeth of said bar; means connected with said base for actuating said pawl and for moving said carriage the space of one tooth of said bar; mechanism comprising an arm pivotally mounted upon a shaft journalled in longitudinally adjustable tapered bushings within bearings secured to said base; a punch adjustably secured in upright position to one end of said arm; a die mounted upon said base and positioned to engage with said punch; said arm cooperating with said index means for cutting one tooth at a time in regular continuous spaced succession from the edge of said saw; and intermittently mechanically operable stripper means connected with said arm for holding the edge of said saw rigidly to the die solely while the punch is cutting a tooth and while being withdrawn from the cut thereof.

4. In apparatus for cutting teeth in handsaws, the combination of a base; rails forming a track horizontally secured to the top of said base; a carriage for said hand saw mounted to slide upon said track; an equally spaced toothed index bar removably affixed to said carriage; a pawl mounted upon said base and operatively engaging with the teeth of said bar; means connected with said base for actuating said pawl and for moving said carriage the space of one tooth of said bar; mechanism comprising an arm pivotally mounted upon a shaft journalled in longitudinally adjustable tapered bushings within bearings secured to said base; a punch adjustably secured in upright position to one end of said arm; a two piece die mounted upon said base and positioned to engage with said punch, each piece of said die being independently longitudinally adjustable in respect to the other, and said arm cooperating with said index means for cutting one tooth at a time in regular continuous spaced succession from the edge of said saw; and intermittently mechanically operable stripper means connected with said arm for holding the edge of said saw rigidly to the die solely while the punch is cutting a tooth, and while being withdrawn from the cut thereof.

5. In apparatus for cutting teeth in handsaws, the combination of a hollow base rectangular in form; a plate firmly mounted upon said base; rails forming a track horizontally secured to the top of said plate; a carriage for said hand saw mounted to slide upon said track and having shoes in spring yielding sliding engagement with one of said rails; an equally spaced toothed index bar removably affixed to said carriage; a pawl mounted upon said base and operatively engaging with the teeth of said bar; means connected with said base for actuating said pawl and for moving said carriage the space of one tooth of said bar; mechanism comprising an arm pivotally mounted upon a shaft journalled in longitudinally adjustable tapered bushings within bearings secured to said base; a punch adjustably secured in upright position to one end of said arm; a two piece die mounted upon said base and positioned to engage with said punch; each piece of said die being independently longitudinally adjustable in respect to the other, and said arm cooperating with said index means for cutting one tooth at a time in regular continuous spaced succession from the edge of said saw; and intermittently mechanically operable stripper means connected with said arm for holding the edge of said saw rigidly to the die solely while the punch is cutting a tooth, and while being withdrawn from the cut thereof.

BYRON G. DAGGETT.

REFERENCES CITED

The following references are of record in the file of this patent:

UNITED STATES PATENTS

| Number | Name | Date |
| --- | --- | --- |
| 1,717 | Carver | Aug. 12, 1840 |
| 37,853 | Chapman | Mar. 10, 1863 |
| 154,200 | Vosburgh | Aug. 18, 1874 |
| 205,311 | Spaulding | June 25, 1878 |
| 207,456 | Strong | Aug. 27, 1878 |
| 383,191 | Romer et al. | May 22, 1888 |
| 888,704 | Gebhart | May 26, 1908 |
| 1,805,831 | Mathieu | May 19, 1931 |
| 2,318,478 | Gardner | May 4, 1943 |
| 2,407,921 | Engle | Sept. 17, 1946 |